United States Patent
Varnado

(10) Patent No.: US 6,588,440 B2
(45) Date of Patent: Jul. 8, 2003

(54) PORTABLE VERTICALLY MOUNTED HUNTING BLIND

(76) Inventor: Reuben L. Varnado, 2326 Cleveland Ave., Decatur, AL (US) 35601

( * ) Notice: Subject to any disclaimer, the term of this patent is extended or adjusted under 35 U.S.C. 154(b) by 80 days.

(21) Appl. No.: 09/837,032

(22) Filed: Apr. 18, 2001

(65) Prior Publication Data

US 2002/0152665 A1 Oct. 24, 2002

(51) Int. Cl.[7] .............................................. E04H 15/04
(52) U.S. Cl. ..................... 135/901; 135/90; 135/120.1; 135/96; 43/1; 182/187; 224/160; 248/218.4; 248/230.8; 248/311.2
(58) Field of Search ........... 135/90, 90.1, 120.1–120.3, 135/127, 117, 115, 95, 16, 96, 15.1, 901; 248/218.4, 230.8, 311.2; 224/163, 157, 160; 24/68 R, 135 R, 136 B, 168, 163 R, 486, 569, 525; 43/1; 182/116, 136, 187, 188

(56) References Cited

U.S. PATENT DOCUMENTS

| | | | | |
|---|---|---|---|---|
| 3,022,898 A | * | 2/1962 | Loeb | |
| 3,963,156 A | * | 6/1976 | Perrin | .......................... 224/1 R |
| 4,325,529 A | * | 4/1982 | Seebinger | ................... 248/298 |
| 4,473,087 A | | 9/1984 | Cavender | |
| 4,813,441 A | | 3/1989 | Kepley | |
| 4,825,578 A | | 5/1989 | Robinson | |
| 5,241,772 A | | 9/1993 | Hall | |
| 5,282,520 A | | 2/1994 | Walker | |
| 5,371,966 A | | 12/1994 | Hall | |
| 5,398,779 A | | 3/1995 | Meyer | |
| 5,507,362 A | * | 4/1996 | Krueger | .......................... 182/3 |
| 5,593,121 A | * | 1/1997 | Tackett | .................... 248/218.4 |
| 5,613,512 A | | 3/1997 | Bean | |
| 5,669,403 A | | 9/1997 | Belcher | |
| 5,692,582 A | * | 12/1997 | Lindemood | .................. 182/133 |
| 5,848,666 A | * | 12/1998 | Woodall et al. | ............. 182/187 |
| RE36,276 E | * | 8/1999 | Smith | .......................... 182/187 |
| 6,065,722 A | * | 5/2000 | LeVasseur et al. | ........ 248/230.8 |
| 6,086,031 A | * | 7/2000 | Renfro | ..................... 248/218.4 |
| 6,308,722 B1 | * | 10/2001 | Christie | ........................ 135/16 |
| 6,325,174 B1 | * | 12/2001 | Lamar | ......................... 182/187 |

* cited by examiner

Primary Examiner—Carl D. Friedman
Assistant Examiner—Yvonne M. Horton
(74) Attorney, Agent, or Firm—Lanier Ford Shaver & Payne P.C.

(57) ABSTRACT

A portable vertically mounted hunting blind which has two plates and straps forming a fastener which is attached to a tree trunk at any desired height by wrapping the straps around the tree trunk and connecting the straps under tension with a connecting means which maintains the tension. The plates have receptacles for the insertion of a holder, with the holder extending away from the tree trunk. A blind cover is attached to the holder and provides a user with complete camouflage as the user sits within the blind cover. The hunting blind is inexpensive, easy to manufacture, light weight, and easily transportable.

25 Claims, 7 Drawing Sheets

PORTABLE VERTICALLY MOUNTED HUNTING BLIND

BACKGROUND OF INVENTION

1. Field of Invention

The present invention relates generally to the field of blinds used while hunting, bird watching, or performing some other related outdoor activity, and more particularly to blinds for mounting in a tree or other vertically oriented object.

2. Technical Background

When hunting or observing wildlife, hunters or observers (outdoorsmen) must remain completely motionless for long periods of time in order not to scare away animals. In addition, they must be camouflaged to prevent any animals from seeing them, and thus alert the animals of potential danger. These necessary conditions for successfully performing the activity are uncomfortable, especially during inclement weather, and often result in severe muscle cramping.

Therefore, many outdoorsmen will set up hunting blinds on the ground. The blinds obscure the presence of the outdoorsmen by keeping them hidden from view, particularly if the blind is camouflaged. The blinds permit outdoorsmen some freedom of movement, and also protect them from inclement weather, thereby alleviating some of the problems associated with traditional hunting or wildlife observation.

Quite often, however, it is preferable for outdoorsmen to have a birds-eye view. Therefore, many outdoorsmen will position themselves in a tree or other suitable object. Generally, outdoorsmen will have a tree stand to mount in the tree to give themselves a place to sit or stand. A tree stand is a platform which is temporarily mounted on a tree trunk to support a hunter, photographer, or other wildlife observer at an elevated position to see the animals without being seen or otherwise detected. Tree stands are often used in combination with camouflaged clothing to further obscure the observer.

What is needed, therefore, and currently not available in the art, is a portable tree blind which is simple to mount vertically on a tree, is lightweight, and can be assembled quickly and easily.

SUMMARY OF INVENTION

The present invention is a portable, collapsible, compact, lightweight-hunting blind, which can be mounted vertically on a tree trunk at any desired height to provide camouflage to a user. The blind is constructed of two plates interconnected with one or more straps attached to the plates. The plates also each have one or more straps attached to the plates, these straps wrapping around a tree trunk and connecting with a buckle that allows the user to tighten the straps by pulling on one end of the straps. The buckle has a frictional ridge or lip that maintains the tension created by pulling on the strap. Once tightened and secured, these straps hold the plates tightly against the tree trunk. The plates also have receptacles to reversibly receive a holder, which is held in place by the plates, and which extends away from the tree trunk. A cloth-like device or blind cover can be draped from the holder so that a user, positioned near the tree trunk, is covered and camouflaged by the blind cover. The plates, and therefore the holder and blind cover, are held in place frictionally and reversibly by the tension applied to the straps and maintained by the buckles. Pulling the tip of the buckle away from the tree trunk releases the frictional contact of the ridge of the buckle on the straps and the hunting blind can be easily and quickly removed from the tree trunk and disassembled.

One advantage of the present invention is a hunting blind, which may be easily and quickly mounted vertically on a tree.

Another advantage of the present invention is a hunting blind that is safe to use.

Another advantage of the present invention is a hunting blind that is simple and fast to assemble and dissemble.

Another advantage of the present invention is a hunting blind that provides its user with complete camouflage.

Another advantage of the present invention is a hunting blind that is inexpensive and easy to manufacture.

Another advantage of the present invention is a lightweight, easily transportable hunting blind.

These and additional features and advantages of the invention will be set forth in the detailed description which follows, and in part will be readily available to those skilled in the art from that description or recognized by practicing the invention as described herein. It is to be understood that both the foregoing general description and the following detailed description are merely exemplary of the invention and are intended to provide an overview of framework for understanding the nature and character of the invention as it is claimed. The accompanying drawings are included to provide further understanding of the invention, illustrate various embodiments of the invention, and together with the description, serve to explain the principals and operations of the invention.

BRIEF DESCRIPTION OF DRAWING FIGURES

DETAILED DESCRIPTION OF THE PREFERRED EMBODIMENTS

Figure 1:
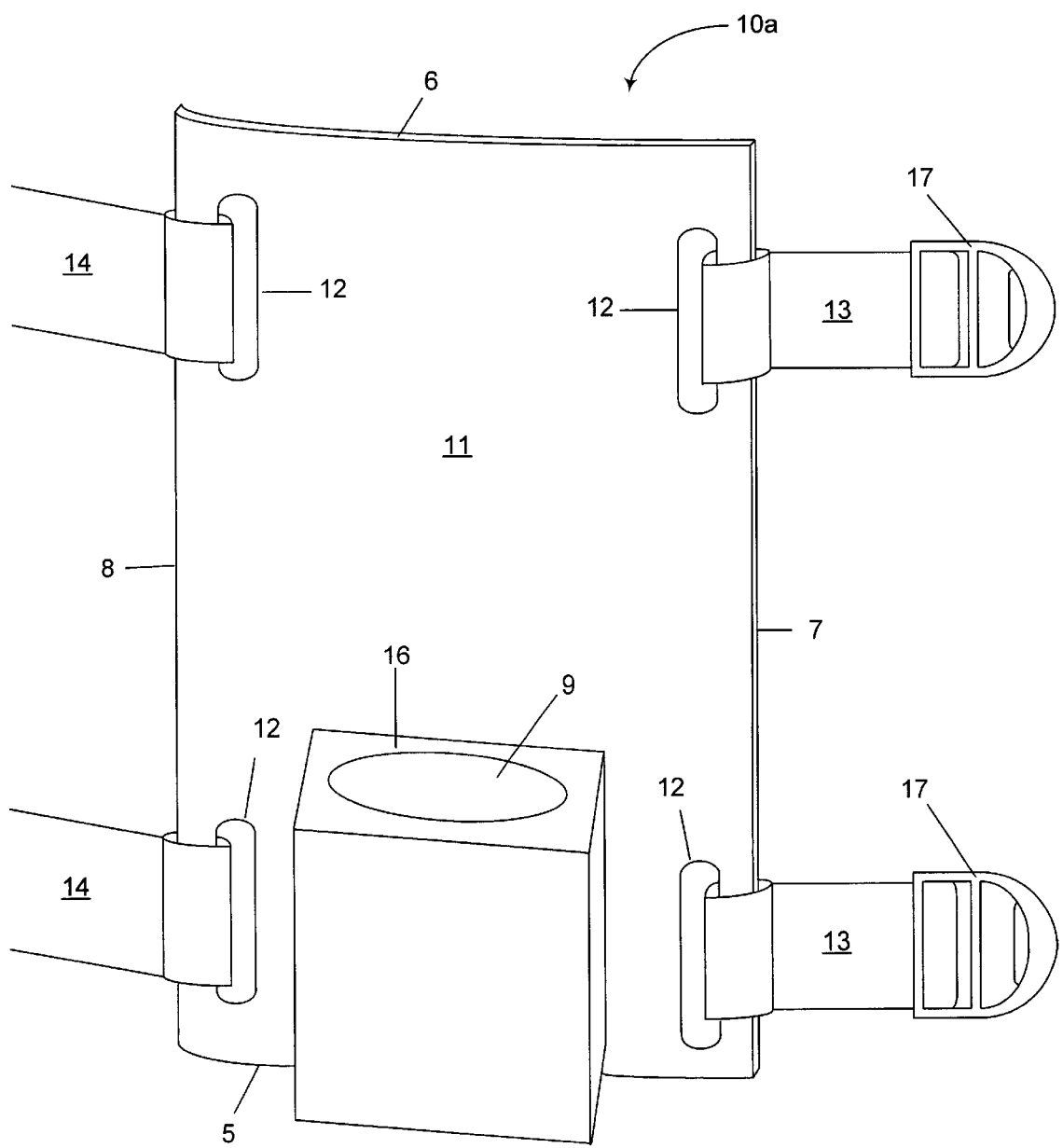
FIG. 1 shows a plate of the present invention with a receptacle and strap connections.

Reference will now be made to the preferred embodiments of the present invention, examples of which are illustrated in the accompanying drawing figures. Where possible, the same reference numbers will be used throughout the drawing figures to refer to same or like parts.

FIG. 1 shows plate 10*a* of the present invention which can be of any suitable shape but is preferably rectangular and slightly concave (curved), as desired, to fit the contour of a tree trunk, or any similar vertical object. Thus, external surface 11 of plate 10*a* would be slightly convex. Plate 10*a* has a plurality of openings 12, preferably four, for the attachment of attachment straps 13 and interconnecting straps 14. Attachment straps 13 are attached to Plate 10a in openings 12 on outer edge 7. Interconnecting straps 14 are attached to plates 10a and 10b (see FIG. 2) in openings 12 on inner edges 8. Plate 10a also has a receptacle 16 with opening 9 for the insertion of a holder 40 (see FIGS. 6 and 7) to suspend a blind cover 50. Straps 13 have connecting means, preferably securing buckles 17.

Figure 2:
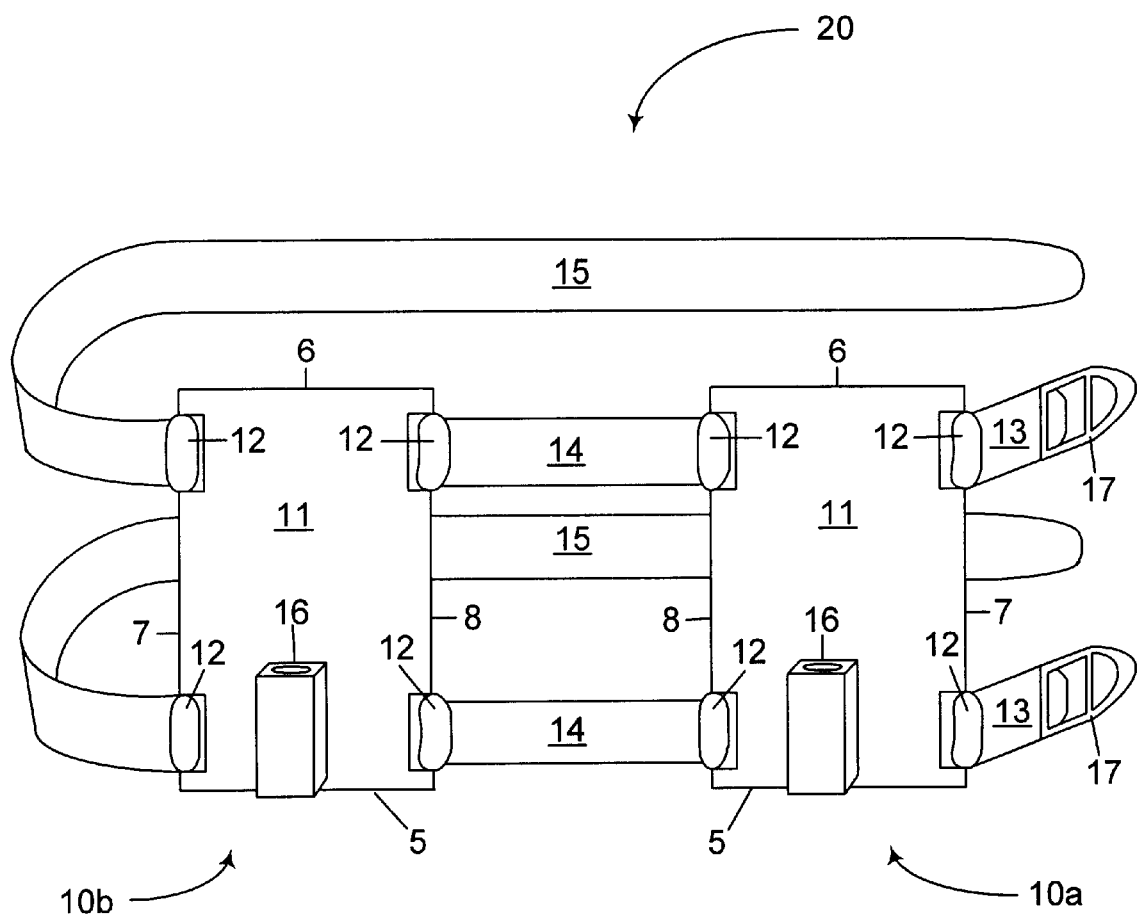
FIG. 2 shows a view of the hunting blind fastener of the present invention showing the plates with the associated strap assemblies for reversibly attaching the plates to the trunk of tree.

FIG. 2 shows a perspective view of hunting blind fastener 20 of the present invention. Hunting blind fastener 20 has two plates 10a and 10b which are identical in shape and construction interconnected with interconnecting straps 14. Plate 10b has securing straps 15 attached to plate 10b at outer edge 7. Plates 10a and 10b may be constructed of any suitable material, preferably metal.

Figure 3:
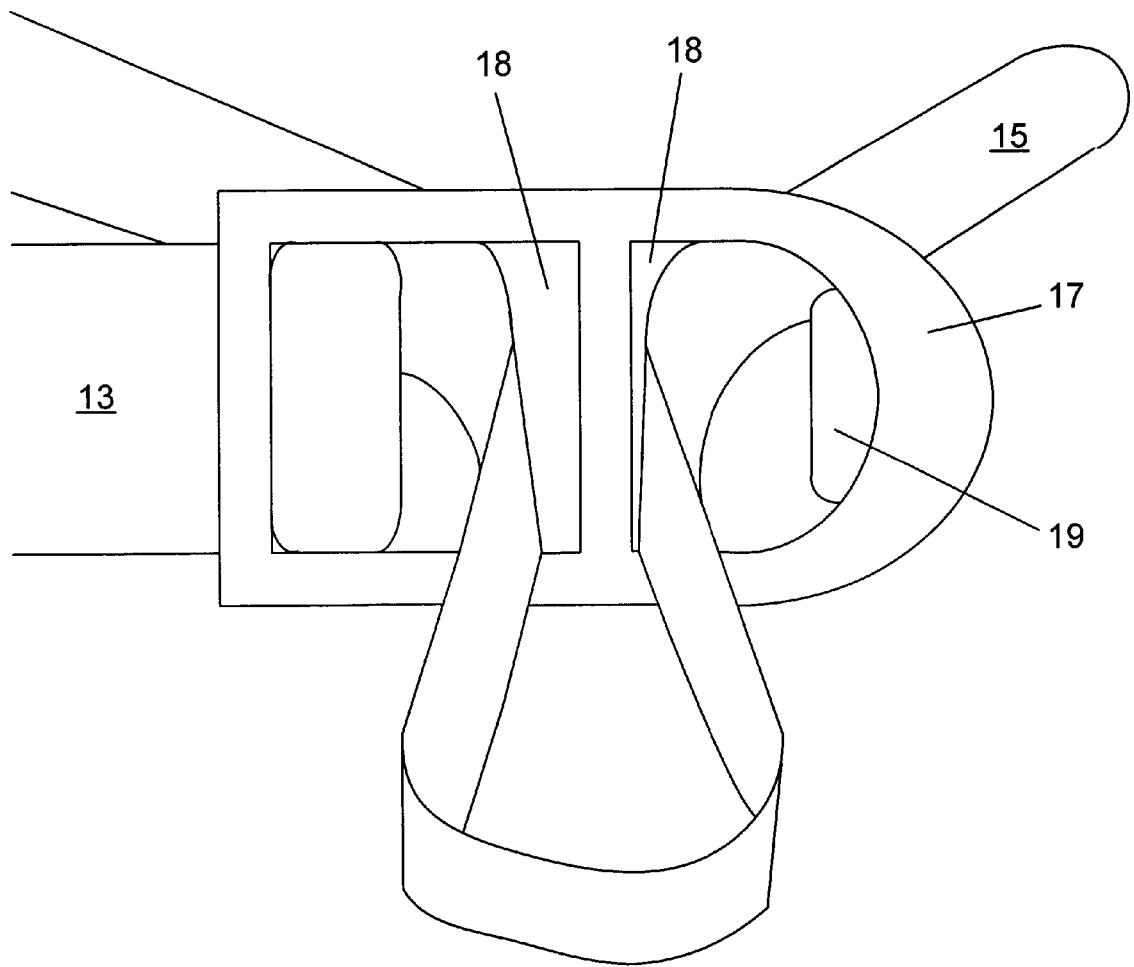
FIG. 3 shows a detailed view of the securing buckle of the present invention.

FIG. 3 shows details of securing buckle 17, which is well known in the art. Securing buckle 17 has openings 18 and ridge 19. When securing strap 15 is inserted through opening 18 as shown, strap 15 can be pulled through buckle 17 freely, but will not move in the reverse direction when under tension because of frictional resistance produced by ridge 19 against strap 15. However, rotating the buckle outward towards strap 13 releases this friction provided by ridge 19, and strap 15 can be withdrawn from buckle 17. Although buckle 17 is a preferred embodiment of the present invention, any connecting means may be used that will maintain tension created by pulling on securing straps 15.

Figure 4:
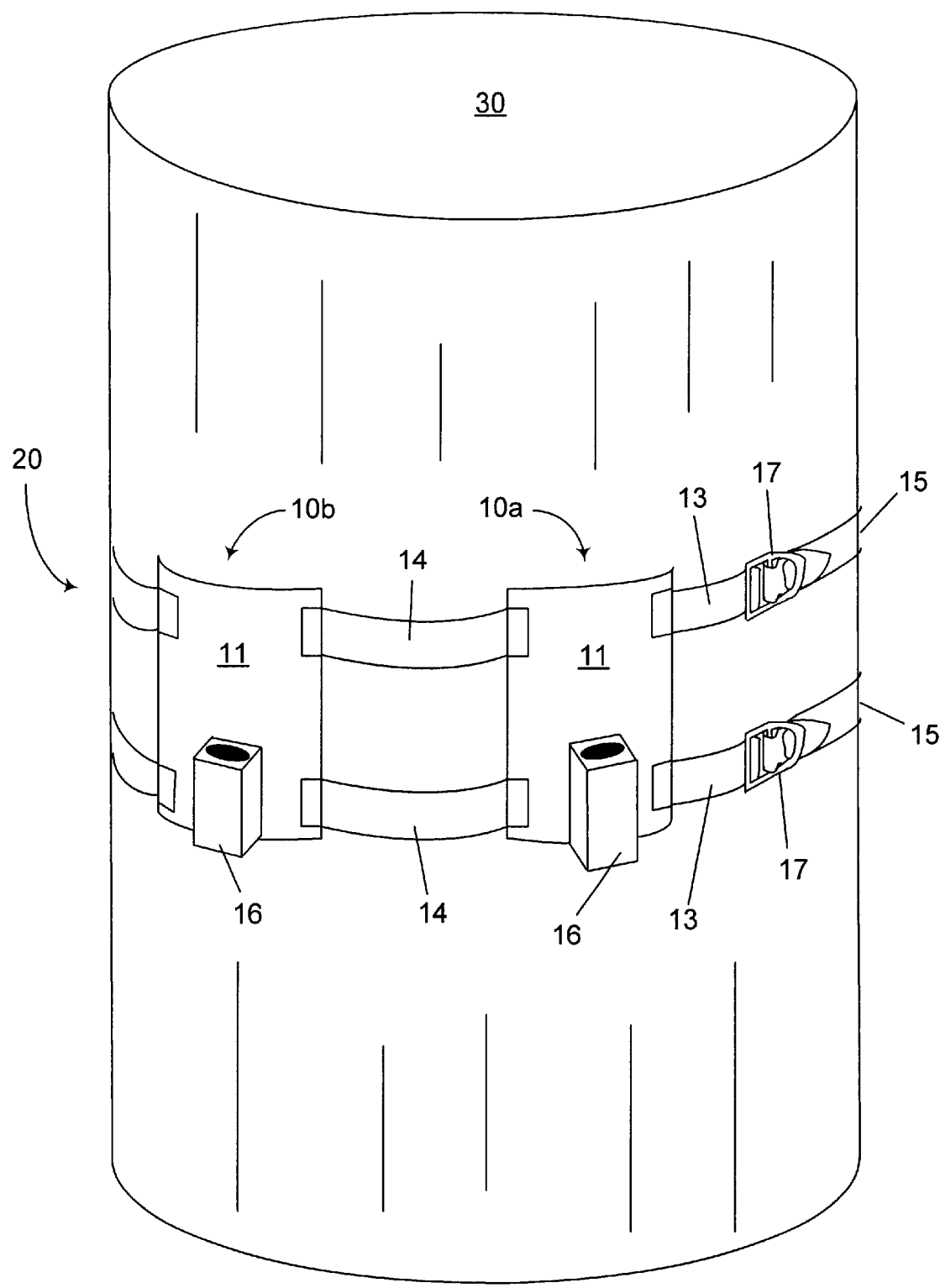
FIG. 4 shows a view of the hunting blind fastener of the present invention in place on a tree trunk.

FIG. 4 shows a view of hunting blind fastener 20 secured in position on tree trunk 30. Hunting blind fastener 20 is secured in place by passing securing straps through securing buckle 17, as shown in FIG. 3, and pulling strap 15 as tightly as desired. Securing straps 15 thereby create sustained tension along plates 10a and 10b, interconnecting straps 14, attachment straps 13, and securing straps 15. The tension is sustained by connecting means (buckle 17). Hunting blind fastener 20 can be positioned on trunk 30 at any height desired, and will be held securely in place by the tension in the straps and plates and the resulting frictional forces between the straps and plates against tree trunk 30.

Figure 5:
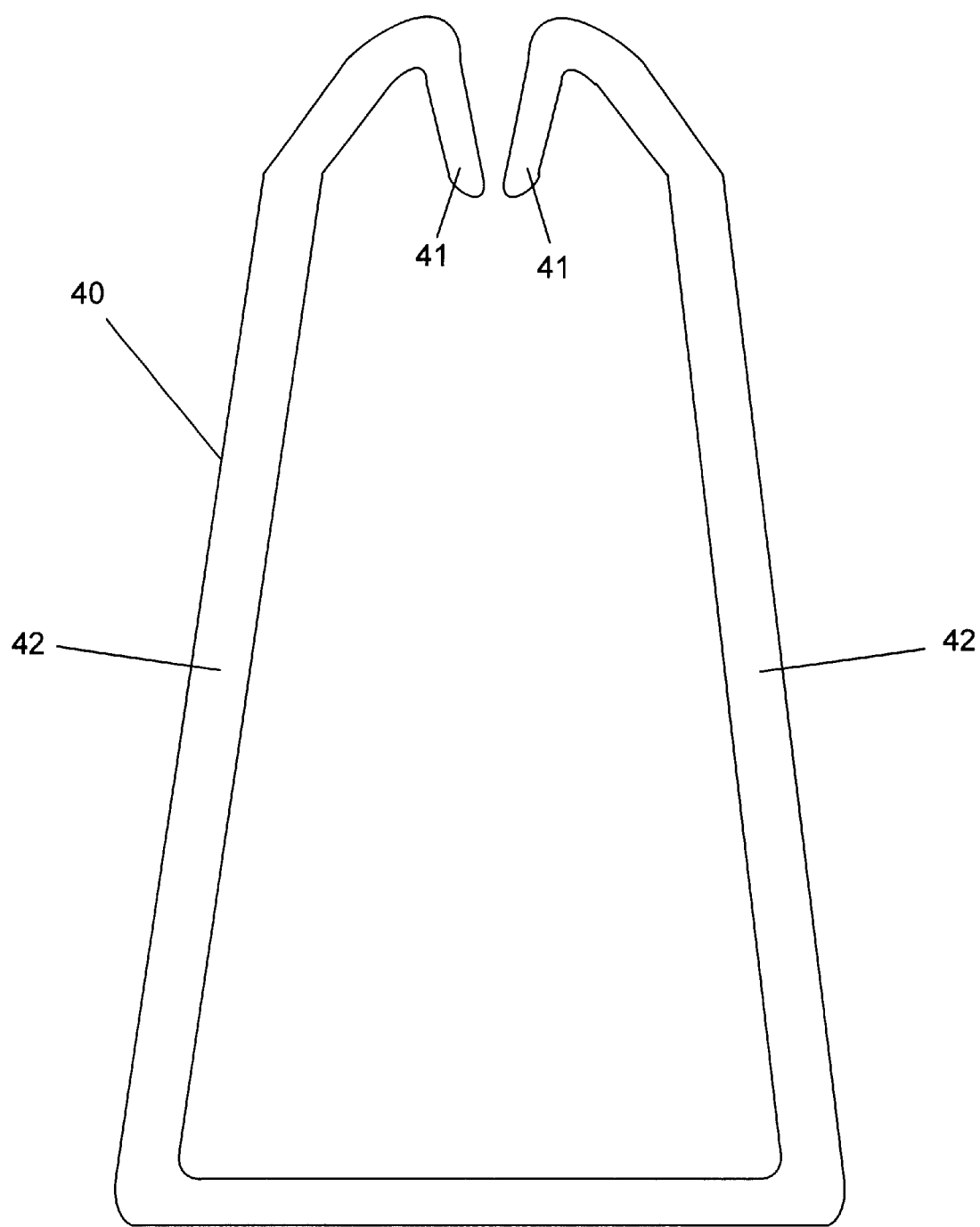
FIG. 5 shows the holder of the present invention.

FIG. 5 shows a holder 40 of the portable vertically mounted hunting blind of the present invention. The holder is preferably a u-shaped tubular assembly. Each end 41 of the u-shaped tubular assembly 40 is bent at approximately right angles to the legs 42 of assembly 40. Assembly 40 can be made of a plurality of pieces so that it can be assembled and disassembled for portability. Although approximate right angles between ends 41 and legs 42 are preferred, any angle desired may be used.

Figure 6:
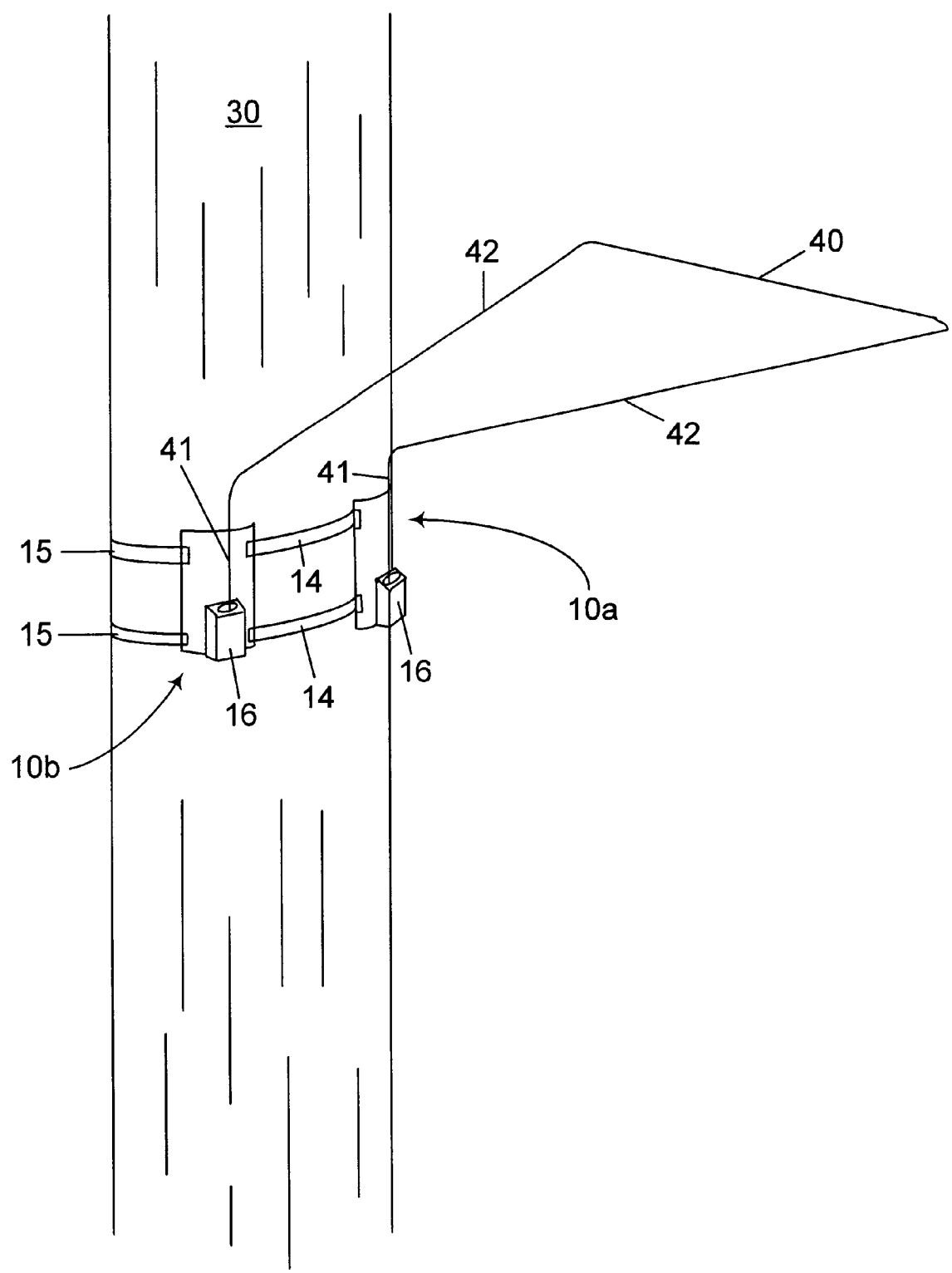
FIG. 6 shows the holder inserted into the receptacles of the plates, in position on a tree trunk.

FIG. 6 shows holder 40 inserted into receptacles 16 of plates 10a and 10b. Ends 42 of holder 40 are placed into openings 9 of receptacles 16. Holder 40, thus, extends away from tree trunk 30, at any angle desired, preferably approximately perpendicular to trunk 30.

Figure 7:
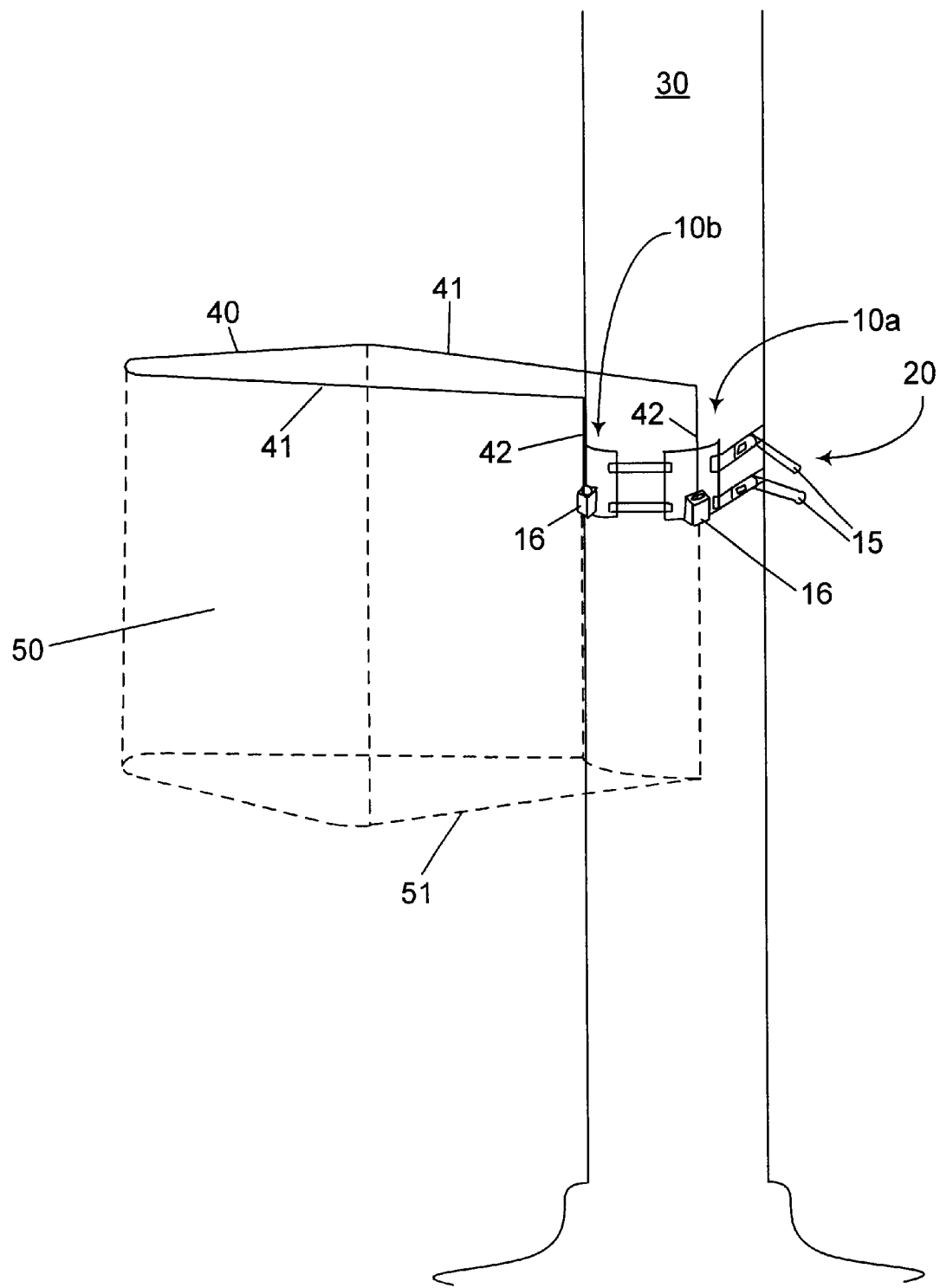
FIG. 7 shows the blind cover attached to the holder, the holder being inserted in the receptacles of the plates mounted in a tree trunk, forming the vertically mounted hunting blind of the present invention.

FIG. 7 shows the portable vertically mounted hunting blind of the present invention mounted on tree trunk 30, with a blind cover 50 attached to holder 40 and hanging therefrom. Blind cover 50 can be made of any suitable cloth-like material, preferably made of plastic fibers or sheets, and preferably having a net-like structure. Blind cover 50 can be attached to assembly 40 by any suitable means. For example, blind cover 50 may have a fold or loop on one end into which assembly 40 is inserted. Alternatively, various devices such as clips, buttons, snaps, hook and pile arrangements, and the like, may be used. In addition, blind cover 50 may have some suitable weighted material at its free hanging end 51 to prevent movement of blind cover 50 from the effects of wind.

The method of use of the hunting blind of the present invention is provided in the following description. Plates 10a and 10b, interconnected by one ore more interconnecting straps 14, on inner edges 8 are placed on the surface of the trunk of a tree 30 at any desired height. Securing straps 15, attached at outer edges 7 of plate 10b are wrapped around the tree trunk 30 and inserted into the connecting means or buckles 17 on attachment straps 13, straps 13 being attached to outer edge 7 of plate 10a. Straps 15 are then pulled with desired tension so that hunting blind fastener 20 is frictionally attached to tree trunk 30. The tension is maintained by the connecting means (buckle 17). Holder 40 is inserted into receptacles 16 on lower edges 5 of plates 10a and 10b. Blind cover 50 is attached to holder 40 and allowed to hang freely. The hunting blind may be quickly removed from tree trunk 30 by reversing the order of steps described above, or by releasing the tension in connecting means 17 by, for example, pulling buckles 17 away from the trunk 30, thereby releasing the frictional resistance of ridges 19 on securing straps 15.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the plates may be constructed of wood or plastic. Likewise, the holder may be constructed of wood or plastic. The blind cover may be of any length desired. The connecting means may be loops through which securing straps are inserted, folded over on themselves, and attached to themselves by standard means known in the art, preferably, hook and pile arrangements. The straps may be connected to the edges of the plates by rivets, screws, glue, hook and pile arrangements, and the like, or may be sewn in place.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. A portable vertically mounted hunting blind, comprising:
    a) first and second plates, each plate having an inner edge, an outer edge, and a receptacle;
    b) said first and second plates interconnected by one or more interconnecting straps attached to said inner edges of said plates;
    c) one or more attachment straps attached at said outer edge of said first plate, said attachment straps having connecting means;
    d) one or more securing straps attached on said outer edge of said second plate, said securing straps engaging said connecting means, so that said securing straps create sustained tension along said first and second plates, said interconnecting straps, said attachment straps, and said securing straps;
    e) a holder, said holder reversibly fitting into said receptacles; and
    f) a blind cover reversibly attached to said holder.

2. The hunting blind of claim 1 wherein said plates are constructed of metal.

3. The hunting blind of claim 2 wherein said plates are concave.

4. The hunting blind of claim 1 wherein said connecting means comprises a buckle having a ridge to maintain sustained tension.

5. The hunting blind of claim 1 wherein said straps are constructed of plastic.

6. The hunting blind of claim 1 wherein said holder is u-shaped.

7. The hunting blind of claim 1 wherein said connecting means is a loop and said securing belt has a hook and pile arrangement.

8. The hunting blind of claim 6 wherein said holder is constructed of metal.

9. The hunting blind of claim 1 wherein said holder is constructed of a plurality of pieces for portability.

10. The hunting blind of claim 1 wherein said blind cover is made of plastic.

11. The hunting blind of claim 10 wherein said blind cover is weighted to prevent movement.

12. The hunting blind of claim 1 wherein said plates have one or more openings on said inner edges and said outer edges for attachment of said straps.

13. A method for mounting a portable hunting blind to a vertical object, comprising:
 a) providing a hunting blind fastener having two plates, one or more interconnecting straps, one or more attachment straps, and one or more securing straps, said attachment straps having connecting means and said plates having receptacles;
 b) placing said blind fastener around the vertical object;
 c) engaging said securing straps with said connecting means and applying tension to said securing straps, said connecting means maintaining the tension;
 d) providing a holder and a blind cover;
 e) inserting said holder into said receptacles; and
 f) attaching said blind cover to said holder.

14. The method according to claim 13 wherein said blind fastener is removable from the vertical object by releasing the tension in said connecting means.

15. The method according to claim 13 wherein said plates are constructed of metal.

16. The method according to claim 15 wherein said plates are concave.

17. The method according to claim 13 wherein said connecting means comprises a buckle having a ridge to maintain sustained tension.

18. The method according to claim 13 wherein said straps are constructed of plastic.

19. The method according to claim 13 wherein said holder is u-shaped.

20. The method according to claim 13 wherein said connecting means is a loop and said securing belt has a hook and pile arrangement.

21. The method according to claim 19 wherein said holder is constructed of metal.

22. The method according to claim 13 wherein said holder is constructed of a plurality of pieces for portability.

23. The method according to claim 13 wherein said blind cover is made of plastic.

24. The method according to claim 23 wherein said blind cover is weighted to prevent movement.

25. The method according to claim 13 wherein said plates have one or more openings on said inner edges and said outer edges for attachment of said straps.

* * * * *